US007015273B2

(12) United States Patent
Cabrera

(10) Patent No.: US 7,015,273 B2
(45) Date of Patent: Mar. 21, 2006

(54) POLYMER COMPLEX COATING AGENTS, METHOD FOR THE PRODUCTION AND USE THEREOF

(75) Inventor: Ivan Cabrera, Dreieich (DE)

(73) Assignee: Celanese Emulsions GmbH, (DE)

(*) Notice: Subject to any disclaimer, the term of this patent is extended or adjusted under 35 U.S.C. 154(b) by 209 days.

(21) Appl. No.: 10/168,712

(22) PCT Filed: Dec. 19, 2000

(86) PCT No.: PCT/EP00/12948

§ 371 (c)(1),
(2), (4) Date: Jun. 19, 2002

(87) PCT Pub. No.: WO01/48096

PCT Pub. Date: Jul. 5, 2001

(65) Prior Publication Data

US 2003/0055156 A1    Mar. 20, 2003

(30) Foreign Application Priority Data

Dec. 23, 1999 (DE) ............................... 199 62 319

(51) Int. Cl.
*C08L 39/067* (2006.01)
*C08L 33/02* (2006.01)
*C08K 3/10* (2006.01)

(52) U.S. Cl. .................. 524/516; 524/413; 524/522
(58) Field of Classification Search ............... 524/516, 524/522, 398, 413, 431
See application file for complete search history.

(56) References Cited

U.S. PATENT DOCUMENTS

| | | | | |
|---|---|---|---|---|
| 4,022,743 A | * | 5/1977 | Patella et al. ............. 524/813 |
| 4,061,720 A | * | 12/1977 | Phillips ..................... 423/265 |
| 4,536,539 A | | 8/1985 | Lundberg et al. ......... 524/521 |
| 4,571,415 A | | 2/1986 | Jordan, Jr. ................. 524/428 |
| 4,720,343 A | | 1/1988 | Walch et al. ........... 210/500.28 |
| 4,778,839 A | | 10/1988 | Golder et al. ............. 524/100 |
| 4,797,437 A | | 1/1989 | Golder et al. ............. 524/100 |
| 5,009,824 A | | 4/1991 | Walch et al. ............. 264/45.1 |
| 5,152,894 A | | 10/1992 | Haubs et al. ........... 210/500.38 |
| 5,403,393 A | | 4/1995 | Dubble ..................... 106/277 |
| 5,527,853 A | | 6/1996 | Landy et al. ............. 524/521 |
| 5,544,972 A | | 8/1996 | Boldt ......................... 404/75 |
| 5,601,880 A | * | 2/1997 | Schwarte et al. ......... 427/407.1 |
| 5,681,880 A | * | 10/1997 | Desor et al. .............. 524/320 |
| 5,705,553 A | | 1/1998 | Kuropka .................... 524/459 |
| 5,725,961 A | * | 3/1998 | Ozawa et al. ............ 428/32.38 |
| 5,728,777 A | * | 3/1998 | Guo .......................... 525/328.8 |
| 5,786,127 A | | 7/1998 | Madoux et al. ........... 430/273.1 |
| 5,905,114 A | * | 5/1999 | Baumstark et al. ........ 524/801 |
| 6,015,624 A | * | 1/2000 | Williams .................. 428/32.1 |
| 6,113,989 A | * | 9/2000 | Sinko ........................ 427/408 |
| 2004/0058082 A1 | * | 3/2004 | Schachter et al. ......... 427/405 |

FOREIGN PATENT DOCUMENTS

| | | | |
|---|---|---|---|
| DE | 1 669 093 | | 5/1971 |
| DE | 24 07 505 | | 10/1975 |
| EP | 0 200 249 | | 12/1986 |
| EP | 0 409 459 | | 1/1991 |
| EP | 0 594 321 | | 4/1994 |
| EP | 0 620 256 | | 10/1994 |
| EP | 0 721 003 | | 7/1996 |
| EP | 0 728 822 | | 8/1996 |
| GB | 1150283 | | 4/1969 |
| GB | 2365860 A | * | 2/2002 |
| WO | WO 94/29391 | | 12/1994 |

OTHER PUBLICATIONS

Derwent abstract for DE 1 669 093, Badische Anilin & Soda Fab AG, "Polyacrylate coating compositions of improved spreading", May 6, 1971.
Derwent abstract for DE 24 07 505, Plate Bonn GMBH, "Stable aq. powdered copolyamide etc. dispersions—esp. useful as fabric bonding agents", Oct. 9, 1975.
English abstract for EP 0 721 003, Dr. Gerfried Klintschar, et al., "Water dilutable paint for road markings", Jul. 10, 1996.

* cited by examiner

*Primary Examiner*—Callie Shosho
(74) *Attorney, Agent, or Firm*—Charles A. Muserlian

(57) ABSTRACT

The invention relates to water-dilutable binding agents and coating agents with particularly quick drying surfaces. The invention also relates to a method for the production and use thereof. The water-dilutable binding agents are based on polymer dispersions, which are characterized in that they contain at least one poly acid/polyvinylpyrrolidone complex and optionally one or several water-soluble zircon compounds. The inventive binding agents have a quick drying surface and are suitable for use in the production of primers, paints and plasters with quick drying surfaces or quick-acting wash-fastness.

14 Claims, No Drawings

POLYMER COMPLEX COATING AGENTS, METHOD FOR THE PRODUCTION AND USE THEREOF

Coatings which dry rapidly at the surface are needed for many applications. The coated articles can be used almost immediately after their coating and/or can be processed independently of weather conditions, such as atmospheric humidity and temperature, for example. One typical example of such applications are roadmarking paints. They are intended to have very short drying times, so that the work can be carried out practically without closing the road. Other examples are exterior paints for the faces of buildings, the roofs of buildings, ships, and freight containers. In the case of these applications, the coating must dry in an extremely short time or even during application, in order to be able to withstand the effects of weathering (such as rain, for example). Further fields of use are renders, which can be used during the transition from fall to winter, and also all kinds of relatively thick coatings which are applied to vertical masonry constructions. Coatings of this kind are required to dry very rapidly so that there is no unwanted running.

The conventional systems for rapid-drying coatings are solventborne systems. With solvent-based paints it is possible to control the rate of drying by varying the solids content and/or the solvent.

Water-thinnable paints are environmentally friendly and in recent times have come more and more to displace their solvent-based counterparts. To prepare a coating composition on an aqueous basis, polymer dispersion binders are used.

A significant disadvantage of water-thinnable paints is the dependence of the drying rate on the atmospheric humidity. At low atmospheric humidity said rate is often quick, in some cases even quicker than with conventional paints. At high atmospheric humidities, however, such as in the morning and evening, and also before or after rainfall, for example, the drying rate is very slow, since the water evaporates very slowly.

For rapid-drying water-based coating compositions, there are three different known principles possessing practical relevance:
1) Flocculation principle:
a) Flocculation of the ionically stabilized binder following application of the coating composition, which contains a polyamine and ammonia as volatile base, by evaporation of the ammonia (U.S. Pat. No. 5,527,853, EP-A-0 594 321, EP-A-0 728 822, EP-A-0 409 459).
b) Flocculation of the ionically stabilized binder by spraying an acid solution (WO 94/29 391) or a salt solution (EP-A-0 200 249, U.S. Pat. No. 4,571,415, U.S. Pat. No. 5,403,393) simultaneously with the coating composition.
2) Viscosity alteration at the surface of the coating composition, by:
a) applying a thickener to the fresh coating, resulting in an increase in viscosity (EP-A-0 721 003), or
b) applying a base to the fresh coating, containing a thickener which, however, has not been activated by the setting of a low pH.
3) Water absorption method:
In this case, substances which absorb water, such as silica gels, ion exchangers, and polymer gels, for example, are used during the application of the coating composition.

In the case of coating compositions where drying is activated by evaporation of a volatile base such as ammonia, the scope of application is limited (odor pollution etc.).

Coating compositions which are brought into contact with salts following their application have the disadvantage of being restricted to the use of weakly stabilized dispersions. The salts used must be sprayed as a solution together with the coating composition, or sprayed on or scattered on subsequently. In the case of subsequent application of the salts in solid or dissolved form, considerable fractions may be washed away by rain, thereby severely impairing the efficiency of the method. The quantities of salt washed away by rain generally pass into the groundwater; consequently, this mode of drying is undesirable.

Surprisingly it has now been found that water-dilutable binders based on a polymer dispersion comprising at least one polyacid/polyvinylpyrrolidone complex exhibit markedly accelerated drying of the surface and a quicker wash resistance.

The overall concentration of polyacid/polyvinylpyrrolidone complexes in the binder is preferably less than 10% by weight, with particular preference less than 5% by weight, and in particular less than 2% by weight.

The polyacids and the polyvinylpyrrolidones may in each case comprise homopolymers or copolymers. It is possible to use all of the polyacids that are known to the skilled worker. Preferred polyacids are polyacrylic acids, polymethacrylic acids, and poly(co-methyl vinyl ether-maleic anhydrides). Particularly preferred polyacids are the poly (co-methyl vinyl ether-maleic anhydrides). As polyacids it is also possible to use mixtures of polyacids.

As polyvinylpyrrolidones it is possible to use all of the polyvinylpyrrolidones which are known to the skilled worker. Preferred polyvinylpyrrolidones are poly(homo-N-vinylpyrrolidones) and copolymers of N-vinylpyrrolidone and esters of acrylic acid, methacrylic acid and/or maleic acid, which may also be used in the form of a colloid dispersion mixture, as disclosed, for example, in EP-A-0 894 809. As polyvinylpyrrolidones it is also possible to use mixtures of polyvinylpyrrolidones.

The polyacid/polyvinylpyrrolidone complexes are preferably 1:1 complexes.

In order to improve the drying properties the binders of the invention may where appropriate comprise not only the polyacid/polyvinylpyrrolidone complexes but also one or more water-soluble zirconium compounds, such as ammonium zirconium carbonate, zirconium acetoacetate, zirconium hydroxychloride, zirconium orthosulfate, zirconium propionate and/or potassium zirconium phosphate, for example.

The binders contain preferably up to 50% by weight, with particular preference from 0.5 to 10% by weight, and in particular from 1 to 5% by weight of zirconium compounds, calculated as zirconium oxide.

Furthermore, the binders of the invention may where appropriate further comprise salts, acids, bases, low molecular mass organic substances, film formers, dispersants, protective colloids, stabilizers, surfactants, emulsifiers, polymers, thickeners, wetting agents, pigments, fillers, preservatives and/or defoamers.

Advantageously, no special requirements are imposed on the polymer dispersions present in the binders. Thus it is also possible to use relatively stable polymer dispersions, such as protective-colloid-stabilized dispersions, for example. Similarly, the binders need not necessarily be adjusted to a high pH.

The polymer dispersions may be based on homopolymers and/or copolymers and may where appropriate further comprise additives and auxiliaries. The polymer dispersions may be prepared by all of the techniques known to the skilled worker, such as emulsion polymerization, for example.

In one preferred embodiment the copolymers contain from 70 to 99.7% by weight, based on the total amount of the monomers, of monomers from the group of alkenes, such as ethene, propene or butene, dienes, such as butadiene or isoprene, acrylates and methacrylates of ($C_1$–$C_{12}$) monoalcohols, preferably of ($C_1$–$C_8$) monoalcohols, examples being methanol, ethanol, isopropanol, isobutanol, n-butanol and 2-ethylhexyl alcohol, vinylaromatic monomers, vinyl esters of ($C_1$–$C_{12}$) alkanemonocarboxylic acids, examples being vinyl acetate, vinyl propionate, vinyl n-butyrate, vinyl laurate, ®VeoVa 9 and ®VeoVa 10 (Shell-Chemie, vinyl esters of α,α-dialkyl-branched monocarboxylic acids), vinyl halides, examples being vinyl chloride and vinylidene chloride, α,β-monoolefinically unsaturated nitriles, examples being acrylonitrile and methacrylonitrile, and alkyl esters of monoolefinically unsaturated dicarboxylic acids, examples being di-n-butyl maleate and fumarate.

The copolymers further preferably contain from 0.3 to 10% by weight, with particular preference from 0.5 to 5% by weight, based on the total amount of the monomers, of α,β-monoolefinically unsaturated monocarboxylic and dicarboxylic acids, such as acrylic acid, methacrylic acid, itaconic acid, maleic acid, and fumaric acid, for example, and amides with or without substitution on the nitrogen atoms, such as acrylamide, methacrylamide, N-methylolacrylamide, and N-butoxy-methacrylamide, for example.

Additionally, the copolymers may contain from 0 to 20% by weight, preferably from 0.5 to 5% by weight, based on the total amount of the monomers, of functional monomers, such as hydroxyl-containing monomers, for example, such as hydroxyalkyl acrylates and methacrylates, especially hydroxyethyl methacrylate and hydroxypropyl methacrylate, and/or acetylacetoxy-containing monomers which improve the wet adhesion, especially allyl acetoacetate, acetylacetoxyethyl methacrylate, and acetylacetoxybutyl methacrylate, and/or monomers with a crosslinking action, such as monomers containing epoxide groups and monomers containing silane groups, especially glycidyl acrylate, glycidyl methacrylate, vinyltrimethoxysilane, and methacryloyloxypropyltrimethoxysilane, and/or nitrogen-containing monomers from the group of polymerizable monomers containing an amino, ureido or N-heterocyclic group, examples being dimethylaminoethyl acrylate and methacrylate, N-(2-methacryloylethyl)ethyleneurea, and/or monomers containing keto groups, examples being diacetoneacrylamide, diacetone-methacrylamide, acrolein, and 2-butanone methacrylate.

In self-crosslinking dispersions polymers containing keto groups may further contain up to 5% by weight, based on the total amount of the monomers, of a difunctional or polyfunctional carboxylic hydrazide, an example being adipic hydrazide.

For the preparation of the binders of the invention, at least one polyacid/polyvinylpyrrolidone complex is added to a polymer dispersion, which may also contain additives and/or auxiliaries, and then, where appropriate, one or more water-soluble zirconium compounds, salts, acids, bases, low molecular mass organic substances, film formers, dispersants, protective colloids, stabilizers, surfactants, emulsifiers, polymers, thickeners, wetting agents, pigments, fillers, preservatives and/or defoamers are added to the polymer dispersion/complex mixture.

The binders of the invention are suitable as binders for water-thinnable coating compositions in the widest sense.

The present invention accordingly further provides water-thinnable coating compositions which comprise the binders of the invention and which as a result exhibit accelerated drying of the surface and a quicker wash resistance.

With preference, the coating compositions of the invention comprise primers, exterior paints, interior paints, coating materials, exterior renders, interior renders, or coating compositions for masonry constructions in the widest sense.

The coating compositions of the invention are particularly suitable as road marking paints.

A process for preparing the coating compositions of the invention may comprise adding the necessary additives and/or auxiliaries, such as pigments, fillers, film formers, dispersants, protective colloids, stabilizers, surfactants, emulsifiers, polymers, thickeners, wetting agents, preservatives and/or defoamers, for example, to a binder of the invention.

A further process for preparing the coating compositions of the invention may comprise adding at least one binder of the invention to a water-thinnable coating composition.

Finally, the coating compositions of the invention may also be prepared by adding at least one polyacid/polyvinylpyrrolidone complex and, where appropriate, one or more water-soluble zirconium compounds to a water-thinnable coating composition.

The invention also provides for the use of polyacid/polyvinylpyrrolidone complexes and mixtures comprising at least one polyacid/polyvinylpyrrolidone complex and, where appropriate, one or more water-soluble zirconium compounds in water-thinnable binders and coating compositions and, in particular, for their use as drying accelerators.

The examples which follow are intended to illustrate the invention without, however, restricting it.

In the examples below, a) polyacid/polyvinylpyrrolidone complexes are prepared, b) the drying times of binders with and without polyacid/polyvinylpyrrolidone complex are measured, c) masonry paints with and without polyacid/polyvinylpyrrolidone complex are prepared and their wash resistances are measured, d) interior paints with and without polyacid/polyvinylpyrrolidone complex are prepared and their wash resistances are measured, and e) synthetic resin renders with and without polyacid/polyvinylpyrrolidone complex and synthetic resin renders with and without polyacid/polyvinylpyrrolidone complex and also zirconium compound are prepared and their wash resistances are measured.

a) Preparation of polyacid/polyvinylpyrrolidone complexes:

EXAMPLE 1

Preparation of a 1:1 Poly(co-methyl Vinyl Ether-maleic Anhydride)/Poly(homovinylpyrrolidone) Complex For this purpose, equal amounts of a 10% strength poly (co-methyl vinyl ether-maleic anhydride) solution (Gantrez® AN 169 from ISP Global) and a 10% strength polyvinylpyrrolidone K-90 solution (from ISP Global) are mixed thoroughly with one another with careful stirring. This produces a highly viscous, whitish yellow mixture whose pH is adjusted to about 7.5 using concentrated ammonia.

EXAMPLE 2

Preparation of a 1:1 Poly(co-methyl Vinyl Ether-maleic Anhydride)/Poly(co-vinylpyrrolidone-acrylate) Complex For this purpose, equal amounts of a 10% strength poly (co-methyl vinyl ether-maleic anhydride) solution (Gantrez® AN 169 from ISP Global) and a 10% strength poly (co-vinylpyrrolidone-acrylate) solution (Mowiplus® SA 575 from Clariant) are mixed thoroughly with one another with careful stirring. This produces a highly viscous, whitish yellow mixture whose pH is adjusted to about 7.5 using concentrated ammonia.

b) Measuring the drying times of binders with and without polyacid/polyvinylpyrrolidone complex:

Binders used are the four polymer dispersions A, B, C, and D, and their mixtures with polyacid/polyvinylpyrrolidone complexes. The mixtures of the polymer dispersions with the polyacid/polyvinylpyrrolidone complexes are referred to below as polymer dispersion/complex mixtures.

Polymer dispersions A, B, C, and D:

Dispersion A (Mowilith® DM 2452 from Clariant): aqueous, plasticizer-free dispersion (approximately 50%) of vinyl acetate, Versatic acid vinyl ester, and an acrylate. The dispersion is stabilized with surface-active substances.

Dispersion B (Mowilith® LDM 1871 from Clariant): aqueous, plasticizer-free dispersion (approximately 53%) of vinyl acetate and ethylene. The dispersion is stabilized with surface-active substances and highly polymeric compounds.

Dispersion C (Mowilith® DM 777 from Clariant): aqueous, plasticizer-free dispersion (approximately 46%) based on acrylates and methacrylates. The dispersion is stabilized with surface-active substances.

Dispersion D (Mowilith® LDM 6636 from Clariant): aqueous, plasticizer-free dispersion (approximately 50%) based on acrylates and styrene. The dispersion is stabilized with surface-active substances.

Preparing the polymer dispersion/complex mixtures:

For preparing the polymer dispersion/complex mixtures the polymer dispersions A to D are mixed thoroughly with the polyacid/polyvinylpyrrolidone complex from example 1, with stirring. The amount of complex in the mixture is 1% by weight based on the solids content of the mixture.

Measuring the drying times of the polymer dispersions and of the polymer dispersion/complex mixtures:

In examples 3 to 6, following an aging time of 1 day, dispersions A to D and dispersions A to D containing the polyacid/polyvinylpyrrolidone complex from example 1 are drawn down onto a glass plate using a 300 µm-gap doctor blade. Following drawn down, a drop of water is applied to the films immediately. On the basis of the clouding of the drop, an assessment is made as to whether skin formation or drying of the films takes place. Following application of the first drop, a further drop is placed on the films every 5 minutes and the clouding of the drop is assessed. The point in time at which clouding of the drop is no longer observed indicates the drying time of the dispersion films. Table 1 lists the drying times, thus determined, of the dispersion films A to D and the drying times of the dispersion films A to D containing the polyacid/polyvinylpyrrolidone complex from example 1.

TABLE 1

Drying times of the polymer dispersions A to D and of the corresponding polymer dispersion/complex mixtures at room temperature

| Example | Dispersion | without complex, drying time in minutes | with complex, drying time in minutes |
|---|---|---|---|
| 3 | A | 20 | 0 |
| 4 | B | 5 | 0 |
| 5 | C | 25 | 0 |
| 6 | D | 25 | 0 |

It can be seen that the drying times of all dispersions are drastically shortened by adding a polyacid/polyvinylpyrrolidone complex.

c) Preparing masonry paints with and without polyacid/polyvinylpyrrolidone complex and measuring their wash resistance:

Table 2 shows the formulation of the masonry paints prepared in examples 7 to 13. The binders used are the polymer dispersions A to D and mixtures thereof with the polyacid/polyvinylpyrrolidone complexes from examples 1 and 2 respectively. The polymer dispersion/complex mixtures always contain 1% by weight of complexes. The masonry paints are prepared by mixing the constituents indicated in table 2.

TABLE 2

Formulation of the masonry paints of examples 7 to 13

| Constituents | Parts by weight |
|---|---|
| Water | 130.0 |
| Mowiplus ® XW 330 (Clariant) | 3.0 |
| Tylose ® MH 4000 KG 4 (Clariant) | 2.0 |
| Calgon ® N, 10% (BK Guilini) | 11.0 |
| Defoamer Agitan ® 232 (Münzing Chemie GmbH) | 4.0 |
| Titanium dioxide Kronos ® 2065 (Kronos) | 226.0 |
| Omyacarb ® 5 GU (Omyacarb) | 168.0 |
| Micro Talc ® AT 1 (Norwegian) | 38.0 |
| China Clay ® B (ECCI) | 20.0 |
| Preservative Mergal ® K 10 N (Troy AG) | 2.0 |
| Binder | 375.0 |
| Ammonia conc. (25% strength) (Riedel de Haen) | 2.0 |
| White spirit (ESSO Becker) | 11.0 |
| Butyl diglycol acetate (Merck-Schuchardt) | 8.0 |
| | 1000.0 |

Determining the wash resistances of the masonry paints:

For determining the wash resistances of the masonry paints of examples 7 to 13 they are drawn down onto a glass plate (6 cm×16 cm) using a 100 µm-gap or 300 µm-gap doctor blade. After different times (stopwatch) the glass plates are placed in a glass beaker and 100 g of DI water are run over them evenly. Subsequently, using a photometer, the transmittance (%) of the runoff water is measured. Here it is the case that, with increasing drying of the paint films, the transmittance of the runoff water increases. A transmittance of 100% denotes complete drying of the film.

EXAMPLE 7

Wash Resistances of Masonry Paints (Wet Film Thickness 300 μm) at Room Temperature, Containing as Binders the Dispersion A, with and without Complex from Example 1

| Time (minutes) | Transmittance without complex (%) | Transmittance with complex (%) |
|---|---|---|
| 2  | 0.5 | 4   |
| 5  | 0.5 | 16  |
| 7  | 0.5 | 18  |
| 10 | 0.5 | 46  |
| 15 | 0.8 | 51  |
| 25 | 2   | 77  |
| 30 | 34  | 94  |
| 35 | 60  | 100 |
| 40 | 82  | 100 |
| 45 | 100 | 100 |

EXAMPLE 8

Wash Resistances of Masonry Paints (Wet Film Thickness 100 μm) at Room Temperature, Containing as Binders the Dispersion B, with and without Complex from Example 1

| Time (minutes) | Transmittance without complex (%) | Transmittance with complex (%) |
|---|---|---|
| 2  | 11  | 89  |
| 5  | 21  | 94  |
| 7  | 22  | 96  |
| 10 | 81  | 100 |
| 15 | 100 | 100 |

EXAMPLE 9

Wash Resistances of Masonry Paints (Wet Film Thickness 300 μm) at Room Temperature, Containing as Binders the Dispersion C, with and without Complex from Example 1

| Time (minutes) | Transmittance without complex (%) | Transmittance with complex (%) |
|---|---|---|
| 2  | 0.5 | 2   |
| 5  | 0.5 | 5   |
| 7  | 0.7 | 35  |
| 10 | 0.8 | 44  |
| 15 | 3   | 55  |
| 20 | 4   | 60  |
| 25 | 6   | 70  |
| 35 | 87  | 90  |
| 40 | 95  | 100 |
| 45 | 100 | 100 |

EXAMPLE 10

Wash Resistances of Masonry Paints (Wet Film Thickness 100 μm) at Room Temperature, Containing as Binders the Dispersion D, with and without Complex from Example 1

| Time (minutes) | Transmittance without complex (%) | Transmittance with complex (%) |
|---|---|---|
| 2  | 1   | 36  |
| 5  | 3   | 70  |
| 7  | 98  | 85  |
| 10 | 100 | 100 |
| 15 | 100 | 100 |

EXAMPLE 11

Wash Resistances of Masonry Paints (Wet Film Thickness 100 μm) at +5° C., Containing as Binders the Dispersion B, with and without Complex from Example 1

| Time (minutes) | Transmittance without complex (%) | Transmittance with complex (%) |
|---|---|---|
| 5  | 2  | 62 |
| 7  | 3  | 74 |
| 10 | 4  | 90 |
| 15 | 37 | 95 |
| 20 | 75 | 99 |
| 25 | 99 | 99 |

EXAMPLE 12

Wash Resistances of Masonry Paints (Wet Film Thickness 100 μm) at +5° C., Containing as Binders the Dispersion C, with and without Complex from Example 1

| Time (minutes) | Transmittance without complex (%) | Transmittance with complex (%) |
|---|---|---|
| 5  | 2  | 48 |
| 7  | 3  | 60 |
| 10 | 7  | 67 |
| 15 | 31 | 82 |
| 20 | 52 | 92 |
| 25 | 99 | 99 |

EXAMPLE 13

Wash Resistances of Masonry Paints (Wet Film Thickness 300 µm) at +5° C., Containing as Binders the Dispersion C, with and without Complex from Example 2

| Time (minutes) | Transmittance without complex (%) | Transmittance with complex (%) |
|---|---|---|
| 5 | 1 | 2 |
| 10 | 2 | 5 |
| 15 | 3 | 33 |
| 25 | 5 | 55 |
| 30 | 5 | 70 |
| 40 | 38 | 83 |
| 50 | 99 | 94 |

It can be seen that the wash resistances of the masonry paints are increased in all examples by adding a polyacid/polyvinylpyrrolidone complex.

d) Preparing interior paints with and without polyacid/polyvinylpyrrolidone complex and measuring their wash resistances:

Table 3 shows the formulation of the interior paints prepared in example 14. The binders used are polymer dispersion C or a mixture thereof with the polyacid/polyvinylpyrrolidone complex from example 1. The polymer dispersion/complex mixture contains 1% by weight of complex. The interior paints are prepared by mixing the constituents indicated in table 3.

TABLE 3

Formulation of the interior paints of example 14

| Constituents | Parts by weight |
|---|---|
| Water | 310 |
| Tylose ® MHB 10000 yp (Clariant) | 3.5 |
| Calgon ® N (10% aqueous sol.) (BK Guilini) | 15 |
| Additol ® XW 330 (Clariant) | 2 |
| Agitan ® 217 (Münzing Chemie GmbH) | 1 |
| Mergal ® AF (Troy AG) | 2 |
| Ammonia (Riedel de Haen) | 0.5 |
| Titanium dioxide Kronos ® 2065 (Kronos) | 70 |
| Talc AT 1 | 40 |
| Socal ® P 2 (Deutsche Solvay-Werke GmbH) | 100 |
| China Clay ® B (ECCI) | 40 |
| Omyacarb ® 2 GU (Omyacarb) | 150 |
| Omyacarb ® 5 GU (Omyacarb) | 150 |
| Binder | 100 |
| White spirit ® (ESSO Becker) | 10 |
| Butyl diglycol acetate (Merck-Schuchardt) | 6 |
| | 1000.0 |

Measuring the wash resistances of the interior paints:

The wash resistances of the interior paints from example 14 are measured in the same way as the wash resistances of the masonry paints of examples 7 to 13.

EXAMPLE 14

Wash Resistances of Interior Paints (Wet Film Thickness 100 µm) at Room Temperature, Containing as Binders the Dispersion C, with and without Complex from Example 1

| Time (minutes) | Transmittance without complex (%) | Transmittance with complex (%) |
|---|---|---|
| 2 | 3 | 13 |
| 5 | 7 | 25 |
| 7 | 15 | 63 |
| 10 | 26 | 96 |
| 15 | 100 | 100 |

It can be seen that the wash resistance of the interior paint is increased by adding a polyacid/polyvinylpyrrolidone complex.

e) Preparing renders with and without polyacid/polyvinylpyrrolidone complex and also renders with and without polyacid/polyvinylpyrrolidone complex and zirconium compound, and measuring their wash resistances:

Table 4 shows the formulation of the synthetic resin renders prepared in examples 15 and 16. In example 15 the polymer dispersion A or a mixture thereof with the polyacid/polyvinylpyrrolidone complex from example 1 is used. In example 16 the polymer dispersion A or a mixture thereof with the polyacid/polyvinylpyrrolidone complex from example 1 and a zirconium compound (Bozefix® PAS 5200 from Clariant) is used. The concentration of the polyacid/polyvinylpyrrolidone complex in the binder is 1% by weight, that of the zirconium compound 2% by weight.

TABLE 4

Formulation of the synthetic resin renders of examples 15 and 16

| Constituents | Parts by weight |
|---|---|
| Water | 51.5 |
| Tylose ® MH 10000 YP 2 (Clariant) | 1.5 |
| Mowiplus ® XW 330 (Clariant) | 3.0 |
| Mergal ® K 10 N (Troy AG) | 2.0 |
| Calgon ® N, 10% (BK Guilini) | 6.0 |
| Sodium hydroxide solution, 10% (Riedel de Haen) | 2.0 |
| Agitan ® 218 (Münzing Chemie GmbH) | 2.0 |
| Binder | 140.0 |
| Titanium dioxide Kronos ® 2160 (Kronos) | 20.0 |
| China Clay ® B (ECCI) | 20.0 |
| Omyacarb ® GU (Omyacarb) | 150.0 |
| Omyacarb ® 130 GU (Omyacarb) | 170.0 |
| Calcilit ® 0.1–0.5 (Omyacarb) | 100.0 |
| Calcilit ® 1.5–2.0 (Omyacarb) | 300.0 |
| White spirit (ESSO Becker) | 4.0 |
| Butyl diglycol acetate (Merck-Schuchardt) | 6.0 |
| Polyethylene FPE 930 T (Schwarzwälder Textilwerke Heinrich Kaulsmann GmbH) | 2.0 |
| | 980.0 |

Measuring the wash resistances of the synthetic resin renders:

The wash resistances of the synthetic resin renders from examples 15 and 16 are measured in the same way as the wash resistances of the masonry paints from examples 7 to 13. Etherplan boards were used as the substrate. The coat thickness of the renders is 3 mm.

EXAMPLE 15

Wash Resistances of Synthetic Resin Renders (Coat Thickness 3 μm) at Room Temperature, Containing as Binder the Dispersion A, with and without Complex from Example 1

| Time (minutes) | Transmittance without complex (%) | Transmittance with complex (%) |
|---|---|---|
| 60 | 10 | 27 |
| 75 | 43 | 65 |
| 90 | 45 | 68 |

EXAMPLE 16

Wash Resistances of Synthetic Resin Renders (Coat Thickness 3 Elm) at Room Temperature, Containing as Binder the Dispersion A or a Mixture of Dispersion A and the Complex from Example 1 and a Zirconium Compound (Bozefix® PAS 5200 from Clariant)

| Time (minutes) | Transmittance without (complex + zirconium compound) (%) | Transmittance with (complex + zirconium compound) (%) |
|---|---|---|
| 60 | 9 | 30 |
| 75 | 42 | 68 |
| 90 | 44 | 72 |
| 120 | 55 | 80 |
| 150 | 60 | 91 |

It can be seen that the wash resistances of the synthetic resin renders are increased by adding a polyacid/polyvinylpyrrolidone complex and, respectively, by adding a polyacid/polyvinylpyrrolidone complex and a zirconium compound.

The invention claimed is:

1. A water-thinnable binder, comprising a polymer dispersion prepared by emulsion polymerization and at least one polyacid/polyvinylpyrrolidone complex which has been added to said polymer dispersion wherein the overall concentration of polyacid/polyvinylpyrrolidone complexes in the binder is less than 10% by weight.

2. The binder of claim 1 wherein the polyacids used comprise polyacrylic acids, polymethacrylic acids and/or poly(co-methyl vinyl ether-maleic anhydrides).

3. The binder of claim 1, wherein the polyvinylpyrrolidones used comprise poly(homo-N-vinylpyrrolidones) and/or copolymers of N-vinylpyrrolidone and esters of acrylic acid, methacrylic acid and/or maleic acid.

4. The binder of claim 1, wherein the polyacid/polyvinylpyrrolidone complexes are 1:1 complexes.

5. The binder of claim 1, further comprising one or more additives selected from the group consisting of salts, acids, bases, low molecular mass organic substances, film formers, dispersants, protective colloids, stabilizers, surfactants, emulsifiers, polymers, thickeners, wetting agents, pigments, fillers, preservatives and defoamers.

6. A water-thinnable coating composition comprising the water-thinnable binder of claim 1.

7. The water-thinnable coating composition of claim 6, wherein the water-thinnable coating composition is a composition selected from the group consisting of primer, exterior paint, interior paint, coating material, exterior render, interior render and a coating composition for masonry constructions.

8. A process for preparing a water-thinnable coating composition, comprising the step of adding one or more additives and/or auxiliaries to the binder of claim 1.

9. A process for preparing a water-thinnable coating composition, comprising the step of adding at least one binder of claim 1 to a water-thinnable coating composition.

10. A water-thinnable binder, comprising a polymer dispersion prepared by emulsion polymerization and at least one polyacid/polyvinylpyrrolidone complex which has been added to said polymer dispersion and comprising one or more water-soluble zirconium compounds.

11. The process for preparing a water thinnable binder comprising the step of adding at least one polyacid/polyvinylpyrrolidone complex to a polymer dispersion prepared by emulsion polymerization wherein the overall concentration of polyacid/polyvinylpyrrolidone complexes in the binder is less than 10% by weight.

12. The process of claim 11 further comprising adding at least one additive to the polymer dispersion prepared by emulsion polymerization, wherein the at least one additive is selected from the group consisting of water-soluble zirconium compounds, salts, acids, bases, low molecular mass organic substances, film formers, dispersants, protective colloids, stabilizers, surfactants, emulsifiers, polymers, thickeners, wetting agents, pigments, fillers, preservatives and defoamers.

13. A process for preparing a water-thinnable coating composition, comprising the step of adding at least one polyacid/polyvinylpyrrolidone complex and at least one water-soluble zirconium compounds to a water-thinnable coating composition.

14. A drying accelerator for water-thinnable binders and coating compositions comprising at least one polyacid/polyvinylpyrrolidone complex and at least one water-soluble zirconium compound.

* * * * *